United States Patent [19]

Hedlund

[11] Patent Number: 4,748,362
[45] Date of Patent: May 31, 1988

[54] D. C. MOTOR WITH MULTI-TOOTH POLES

[75] Inventor: Gunnar Hedlund, Stockholm, Sweden

[73] Assignee: EMS Electronic Motor Systems AB, Stockholm, Sweden

[21] Appl. No.: 884,584

[22] Filed: Jul. 11, 1986

Related U.S. Application Data

[63] Continuation-in-part of Ser. No. 776,055, filed as PCT SE84/00438 on Dec. 20, 1984, published as WO85/02951 on Jul. 14, 1985, abandoned.

[30] Foreign Application Priority Data

Dec. 21, 1983 [SE] Sweden .............. 8307088-8

[51] Int. Cl.[4] .............. H02K 1/14; H02K 17/12
[52] U.S. Cl. .............. 310/168; 310/162; 310/254
[58] Field of Search .............. 310/68, 190–193, 310/162–168, 49, 254

[56] References Cited

U.S. PATENT DOCUMENTS

| | | | |
|---|---|---|---|
| 2,054,678 | 9/1936 | Merrill .............. | 310/169 |
| 3,344,325 | 9/1967 | Sklaroff .............. | 310/49 X |
| 3,740,630 | 6/1973 | Jarret .............. | 310/163 X |
| 3,809,990 | 5/1974 | Kuo .............. | 310/49 X |
| 3,995,203 | 11/1976 | Torok .............. | 310/163 X |
| 4,035,680 | 7/1977 | Maeder .............. | 310/168 |
| 4,234,808 | 11/1980 | Geppert .............. | 310/49 |
| 4,286,180 | 8/1981 | Langley .............. | 310/49 X |
| 4,638,195 | 1/1987 | Lin .............. | 310/49 |

FOREIGN PATENT DOCUMENTS 7902845 10/1980 Sweden .............. 310/254
2089136  6/1982 United Kingdom .

OTHER PUBLICATIONS

Finch, et al., "Switched Reluctance Motors with Multiple Teeth Per Pole", 2nd Int'l. Conf. Electrical Machines Design & Applications (Conf. Pub. No. 254), London, Sep. 85 pp. 134–138.

Primary Examiner—Patrick R. Salce
Assistant Examiner—D. L. Rebsch
Attorney, Agent, or Firm—Pollock, Vande Sande & Priddy

[57] ABSTRACT

A variable reluctance motor fed by D.C. pulses is controlled by a rotation sensor. The motor has at least two phases. The stator is designed as a continuous magnetic circuit with two stator poles per phase. The stator poles for the different phases are arranged in sequence along the periphery of the rotor so that each pole adjoins poles pertaining to another phase, and such that diametrically opposed poles pertain to the same phase, each stator pole having at least two teeth per stator pole. The rotor is provided with teeth that cooperate with the stator teeth. The spaces between adjacent stator poles are shorter than the spaces between the teeth of any one stator pole.

7 Claims, 3 Drawing Sheets

D. C. MOTOR WITH MULTI-TOOTH POLES

This is a continuation-in-part of U.S. patent application Ser. No. 776,055, filed as PCT SE84/00438 on Dec. 20, 1984, published as WO 85/02951 on Jul. 4, 1985, abandoned.

BACKGROUND

The present invention refers to a variable reluctance motor for one or more phases of the switched type. A variable reluctance motor consists of a stator for one or more phases, in which each phase may have one or more poles, each incorporating one or more windings. In each phase, the windings are either connected in series, in parallel or in series and parallel. The stator surrounds the rotor, which generally incorporates salient teeth, which can be symmetrical but can be unsymmetrical in some motor designs in order to provide starting torque.

By feeding direct current pulses—with the aid of a so called commutation device—to each phase at certain predetermined angular intervals in the rotor, the required torque in the motor is obtained. These angular intervals in the rotor are scanned by means of a rotor-position sensor which transmits signals to a control device, which in turn controls a power-step for each phase.

For some motor applications, it is desirable to have a motor which is capable of being operated at low speed with a correspondingly higher torque. In known designs for motors, this is achieved by increasing the number of phases, and thus the number of poles on the stator. However, this results in more windings, necessitating both additional labor and more copper, in turn entailing an often considerable increase in price for the motor.

Thus, one purpose of the present invention is to present a reluctance motor with few phases in relation to its speed, that is to say, with as few windings as possible.

The purpose of the invention was to base the new motor concept on the concepts of normal reluctance motors where the stator is designed to be produced as a continuous unit with a continuous magnetic circuit and with poles oriented to the rotor. Each pole is provided with a winding as shown in FIG. 1 as well as in FIG. 2 which illustrate known motors. Such motors are considerably cheaper to produce than motors where the stator is divided into separate stator poles.

PRIOR ART

FIGS. 1 and 2 show two types of variable reluctance motors which have been the base from which the invention has been made in order to provide a motor having improved qualities.

FIG. 1 shows a variable reluctance motor of known design having a stator 1 produced as a continuous unit, i.e. having a continuous magnetic stator circuit, and with six stator poles 2 to 7 and a rotor 8 with four rotor teeth 9 to 12. The motor is of three-phase type and the stator poles operate in pairs 2 and 5; 3 and 6; 4 and 7. Each pole has a winding coil 13,14,15, 16,17,18, respectively. In a three-phase type motor no auxiliary poles for starting torque are needed. In a motor of this kind the commutation frequency at a rotational rate of 3,000 r.p.m. is 600 Hz.

FIG. 2 shows another variable reluctance motor of known design having a stator 19 with four poles 20 to 23 and a rotor 24 with two ordinary rotor teeth 25 and 26. The motor is of two-phase type. Diametrically opposite poles operate in pairs. Each pole has a winding coil 27,28,29 and 30, respectively. The two rotor teeth 25 and 26 are provided with an auxiliary rotor tooth 31 and 32 respectively, in order to achieve a defined starting torque in the rotational direction of the arrow A.

When this motor—like the variant shown in FIG. 1—rotates at a rate of 3,000 r.p.m., it provides a considerably lower torque than the variant shown in FIG. 1. However, the commutation frequency is lower—200 Hz, to be precise—which is an advantage in that eddy current losses are smaller, in turn improving the motor's efficiency.

Also, a common feature of reluctance motors is arranging the poles for the different phases in sequence around the rotor so that each pole on both sides adjoins a pole of another phase. This is also what is shown in FIGS. 1 and 2. It can be clearly seen from the position of the stator poles and the rotor teeth that each phase has two diametrically opposed stator poles.

It has been an object to make a motor having fewest possible stator windings and highest possible torque, and preferably to have only two poles per phase. To achieve a high torque, as many rotor teeth as possible have to be activated. Each stator pole must be toothed for the purpose of increasing the number of rotor teeth to be activated. It is a well known expedient to tooth the stator poles to obtain increased torque. The tooth pitch, i.e. the angular distance between the start of one tooth to that of the next tooth of the stator poles must correspond to the tooth pitch of the rotor, and this for the obvious reason that for each phase there must be a position where the rotor is placed with one rotor tooth in front of each stator pole tooth in that phase. As well known, the purpose of a stator phase when activated is to rotate the rotor into exactly such a position.

How is it then possible to allow each phase to have as many teeth on the rotor cooperating during operation with as many teeth as possible on the operating stator phase? In the prior art motors this has been achieved by providing a large number of teeth on the rotor and by providing toothed stators with many teeth. This has caused quite a lot of problems. A solution to these problems has been to place the stator poles relatively far from one another.

Examples of variable reluctance motors having these qualities are shown for instance by F. W. Merril in U.S. Pat. No. 2,054,678, by C. R. Maeder in U.S. Pat. No. 4,035,680, and by M. F. Scarffe in GB No. 2,089,136.

THE INVENTION

By this invention it is intended to use a maximum number of the teeth provided on the rotor in each operating phase, i.e, to use largest possible part of the periphery.

To achieve this, according to the invention the different stator poles are positioned as close to one another as possible. Thanks to the fact that the rotor teeth are not placed opposite the stator teeth in a not activated phase but displaced in relation to the latter, it is then possible to place each stator pole closer to adjacent stator pole than the space between the teeth on the rotor (now leaving any auxiliary teeth out of account). Since the space between the teeth of the stator poles corresponds to the space between the rotor teeth, the stator poles are placed with their outermost teeth closer to the adjoining stator poles than the space between the stator teeth. Of course this applies to each pair of adjoining stator poles around the entire circumference. This will have as a result that the number of rotor teeth will be smaller than the number of stator teeth.

Choosing many teeth per pole will cause far too great stray inductance between the stator poles for a switched reluctance motor. In the solution according to the invention this results in a practical limitation to two or three teeth per pole, especially if the motor is to be driven at a normal drive motor speed of 3000 r.p.m. To have such a small number of teeth would be an inacceptable limitation in industrial variable reluctance motors to be used as stepping-motors. However, the motor according to the invention is a switched variable reluctance motor and for this kind of variable reluctance motor the torque increase obtained by two or three teeth per pole is quite sufficient. On the contrary, it is important to keep the switch frequency low to reduce eddy current losses in the iron. This in itself also involves a practical limitation to two or three teeth per pole for a motor operating a normal drive motor speed.

BRIEF DESCRIPTION OF THE DRAWINGS

Other objects and advantages will become readily apparent from the following detailed description taken in connection with the accompanying drawing, in which.

DESCRIPTION OF THE PREFERRED EMBODIMENTS

The invention relates to a variable reluctance motor of the switched type. It has a rotor position sensing device and a control circuit including commutation of the current feeding to the winding coils of the kind well known in the art and is for instance described in the British Patent Specification No. 1,597,790. Therefore, sensors and control circuits are not shown in the Figures.

Figure 1:
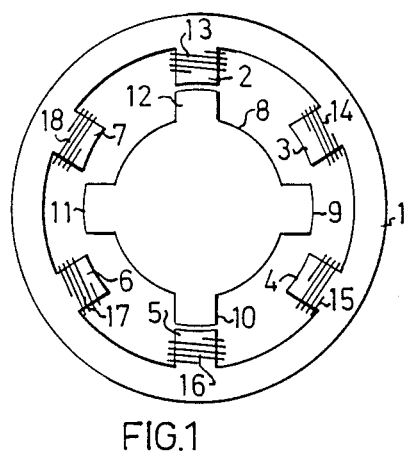
FIGS. 1 and 2 are diagrammatic views of the stator and rotor in two prior art variable reluctance motors discussed above.
Figure 2:
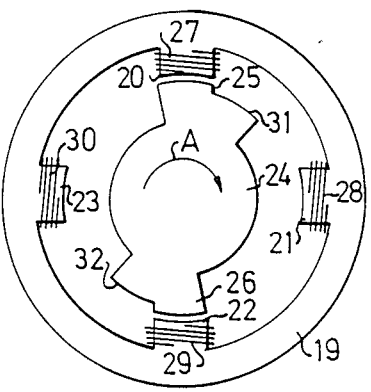
Figure 3:
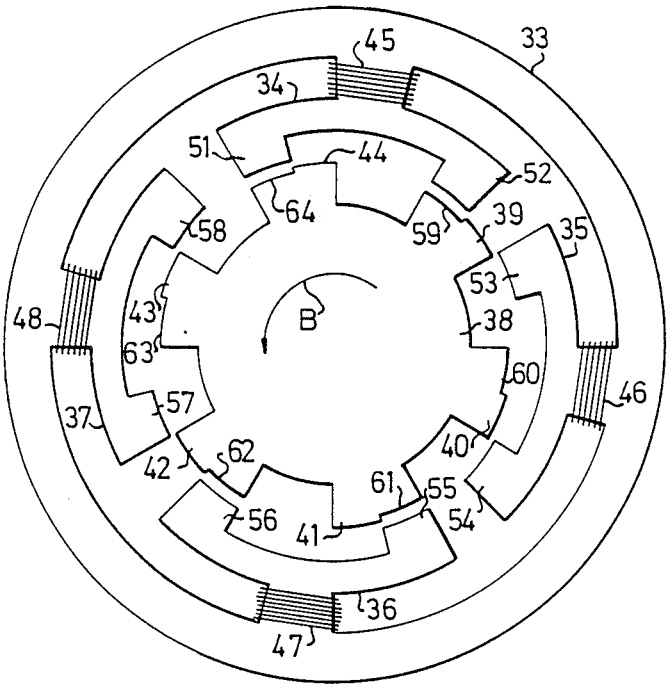
FIG. 3 is a diagrammatic view of a first embodiment of the invention including a two-phase variable reluctance motor having two teeth per stator pole.

FIG. 3 illustrates a first embodiment of the variable reluctance motor according to the invention. This first embodiment is a two-phase motor having a stator 33 being designed as a continuous magnetic circuit with four stator poles 34 to 37, i.e. two poles per phase, and a rotor 38 having six rotor teeth 39 to 44. Each stator pole has a winding coil 45,46,47 and 48, respectively. Each pole has two pole teeth. Thus, the pole 34 has the teeth 51 and 52, the pole 35 the teeth 53 and 54 etc. There are a total number of eight stator pole teeth and there are six ordinary rotor teeth. As mentioned above the tooth pitch of the stator must correspond to the tooth pitch of the rotor. The stator teeth are therefore according to the invention arranged around the rotor in such a way that the distance between the teeth on the same pole is longer than the distance between adjacent teeth belonging to different poles. Thus, the distance between the teeth 51 and 52 is longer than the distance between the teeth 52 and 53, the distance between the teeth 53 and 54 is longer than the distance between the teeth 54 and 55 etc.

In order to achieve a defined starting torque in the counterclockwise direction shown by the arrow B each ordinary rotor tooth is provided with an auxiliary tooth 59,60,61, 62,63 and 64, respectively, on one side of it. The auxiliary teeth shall give a lesser magnetic coupling to the stator pole teeth than the ordinary rotor teeth. Therefore the auxiliary teeth in this embodiment are not protruding radially outwardly to the same extent as the ordinary teeth. This quality can also be achieved in other ways. The condition for this is that the auxiliary teeth shall have a lesser ferromagnetic mass than the ordinary teeth.

As mentioned above the advantage of having toothed poles according to the invention is generally greatest where there are only two or three teeth per pole. If more than three teeth per pole are chosen the commutation frequency should be so high that the good qualities in term of simplicity, slow speed and torque will be swallowed up by increasing eddy current losses, especially if the motor is intended to be driven at a rate of 3,000 r.p.m. or higher.

Figure 4:
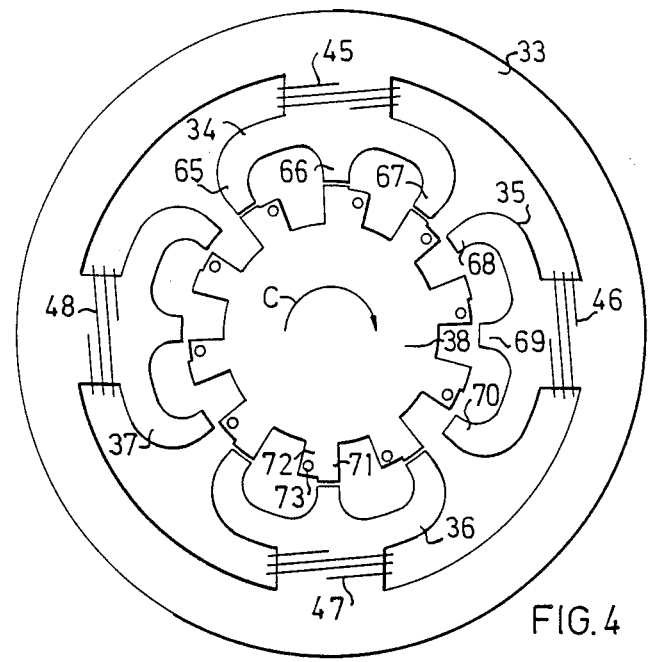
FIG. 4 is a diagrammatic view of a second embodiment of the invention including a two-phase variable reluctance motor having three teeth per stator pole.

FIG. 4 shows a second embodiment of a two-phase variable reluctance motor according to the invention with three teeth per stator pole. Parts corresponding to parts in FIG. 3 have been given the same reference numerals. The pole 34 has the teeth 65,66,67, the pole 35 has the teeth 68,69,70 etc. The total number of stator teeth is twelve and the total number of rotor teeth 71 is ten. According to the invention, thus adjacent teeth on different poles are placed closer to each other than adjacent teeth in the same pole.

Since the poles placed diametrically opposite to each other around the rotor are activated in pairs by the commutating control device, such that the activation of the winding coils 45 and 47 and the activation of the winding coils 46 and 48 are alternatingly changed, as in the first embodiment shown in FIG. 3, each rotor pole has an auxiliary tooth 72 to provide the starting torque in the rotational direction C, clockwise in this embodiment.

It is also evident that the stator poles for the two different phases in the two embodiments mentioned above are arranged in sequence along the periphery of the rotor, so that each pole adjoins poles pertaining to the other phase.

In the embodiment shown in FIG. 4 it is shown that the mass of each auxiliary tooth 72 for instance can be reduced by being provided with a hole 73.

The two-phase motors described above can only be driven in one predetermined rotational direction. Some motor applications need a motor having the possibility to be driven in both the rotational directions. This quality can be achieved by a three-phase motor. The FIGS. 5 and 6 show two embodiments of a three-phase variable reluctance motor according to the invention.

Figure 5:
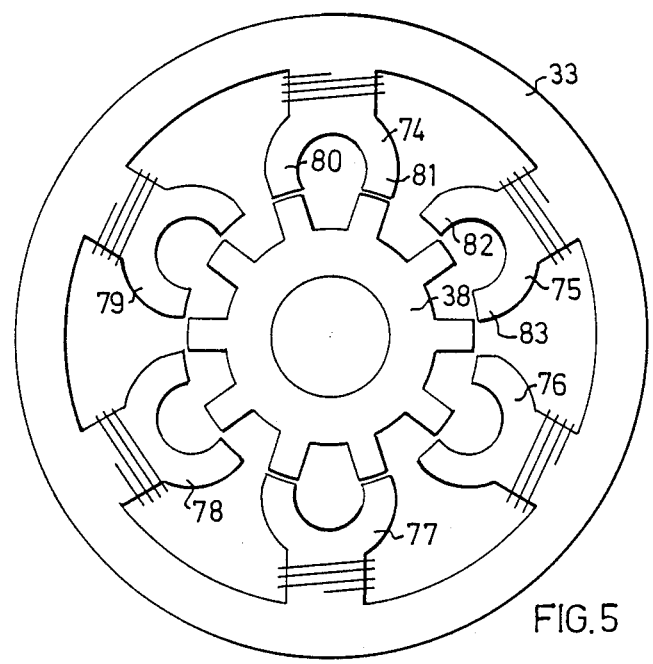
FIG. 5 is a diagrammatic view of a third embodiment of the invention including a three-phase variable reluctance motor having two teeth per stator pole.

The third embodiment of the variable reluctance motor shown in FIG. 5 has a stator 33 having six stator poles 74 to 79. Each pole has two teeth, such that the pole 74 has the teeth 80 and 81, the pole 75 has the teeth 82 and 83 etc. The diametrically opposed poles pertain to the same phase, such that the poles 74 and 77; 75 and 78; 76 and 79 operate in pairs. The rotational direction of the motor is given by the commutation sequence of the current feeding to the phase windings. The total number of stator teeth is twelve and the number of rotor teeth is ten as in the embodiment shown in FIG. 4. No auxiliary teeth are needed.

Figure 6:
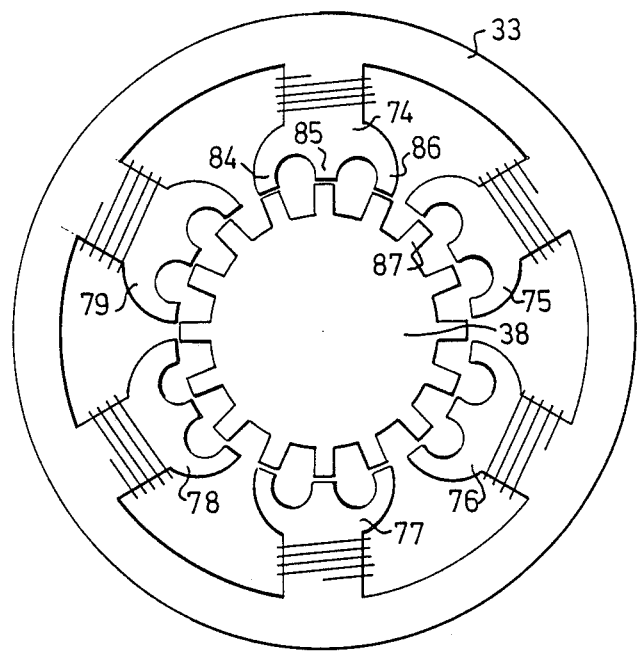
FIG. 6 is a diagrammatic view of a fourth embodiment of the invention including a three-phase variable reluctance motor having three teeth per stator pole.

FIG. 6 shows a fourth embodiment of the motor according to the invention. The motor being of the three-phase type having six poles 74, where each pole has three stator teeth. The total number of stator teeth is eighteen and the number of rotor teeth is sixteen. Also in this embodiment the spaces between adjacent stator poles are shorter than the spaces between the teeth of any one stator pole.

It will be understood that the foregoing descripton of various aspects of the present invention is for purposes of illustration only, and that the structural features and relationships herein disclosed are susceptible to a number of modifications and changes none of which entails any departure from the spirit and scope of the present invention. As an example it should be taken as understood that it is not necessary to have the rotor surrounded by the stator. In principle, the rotor may equally well be on the outside.

It may also be mentioned that a high commutation frequency places considerable demands as to the angular accuracy of the rotor position sensor. Switching the motor on or off too early or too late will result in reduced efficiency. This leads also to the wish to have as few phases as possible. The variable reluctance motor according to the invention being of only two-phase or three-phase type is therefore excellent even to make the commutation control of it relatively easy.

I claim:

1. A variable reluctance motor fed by D.C. pulses, said motor having at least two phases comprising:
    a stator and a rotor, the stator being a continuous magnetic circuit having stator poles for different phases arranged in sequence along the periphery of the rotor connected together in a continuous magnetic circuit so that each pole adjoins poles pertaining to another phase, diametrically opposed poles pertaining to the same phase, each stator pole having at least two teeth per stator pole, and the rotor being provided with teeth which cooperate with the stator teeth, adjacent stator poles being spaced at a distance smaller than the spaces between the teeth for any one stator pole.

2. A reluctance motor according to claim 1, wherein the number of stator teeth per pole is two.

3. A reluctance motor according to claim 1, wherein the number of stator teeth per pole is three.

4. A reluctance motor according to claims 1, 2, or 3 for a two-phase motor, wherein the rotor teeth are of unsymmetrical form to produce a starting torque.

5. A variable reluctance switched motor of at least two phases comprising:
    a plurality of stator poles connected together in a continuous magnetic circuit, a pair of said poles forming a phase, each of said stator poles including at least two spaced apart teeth spaced so that teeth of adjacent poles are closer together than teeth of the same stator poles; and
    a rotor having a plurality of equally spaced teeth, fewer in number than all of said stator pole teeth, spaced apart at a distance substantially equal to the distance between said stator teeth, whereby during energization of each phase, a pair of said rotor teeth are positioned opposite a pair of said teeth of a stator pole whereby during operation of each phase, an equal number of rotor teeth cooperate with an equal number of stator teeth.

6. A variable reluctant two phase switched motor comprising:
    a magnetic stator circuit comprising two pairs of poles connected in a continuous magnetic circuit equally spaced about an axis, connected together to form an annulus, each pole including three equally spaced teeth, adjacent teeth of different poles being spaced apart a distance which is less than the distance between teeth of each pole; and
    a rotor centered on said axis within said annulus having a plurality of equally spaced rotor teeth less than the total number of said stator teeth, said rotor teeth having a spacing which is substantially the same as the spacing of said equally spaced teeth of each stator pole, whereby during rotation of said rotor, the same number of teeth on said rotor cooperate with the same number of stator teeth during each phase.

7. A variable reluctance multi-phase switched motor comprising:
    a plurality of pairs of equally spaced stator poles disposed concentrically about an axis, and connected to form an annulus in a continuous magnetic circuit, each pair constituting a phase when energized by a respective winding, each pole including at least two spaced teeth, adjacent teeth of adjacent poles being spaced at a distance which is less than the spacing between teeth of the same pole; and
    a rotor having a plurality of teeth fewer in number than the total number of said stator pole teeth, spaced apart at a distance substantially equal to the spacing between teeth of one stator pole, whereby during activation of each phase, an equal number of rotor teeth are available to cooperate with an equal number of stator teeth.

* * * * *